Aug. 8, 1961  H. M. FREDERICK ET AL  2,995,364
ITEM FEEDING AND ALIGNING APPARATUS
Filed Nov. 17, 1958  3 Sheets-Sheet 1
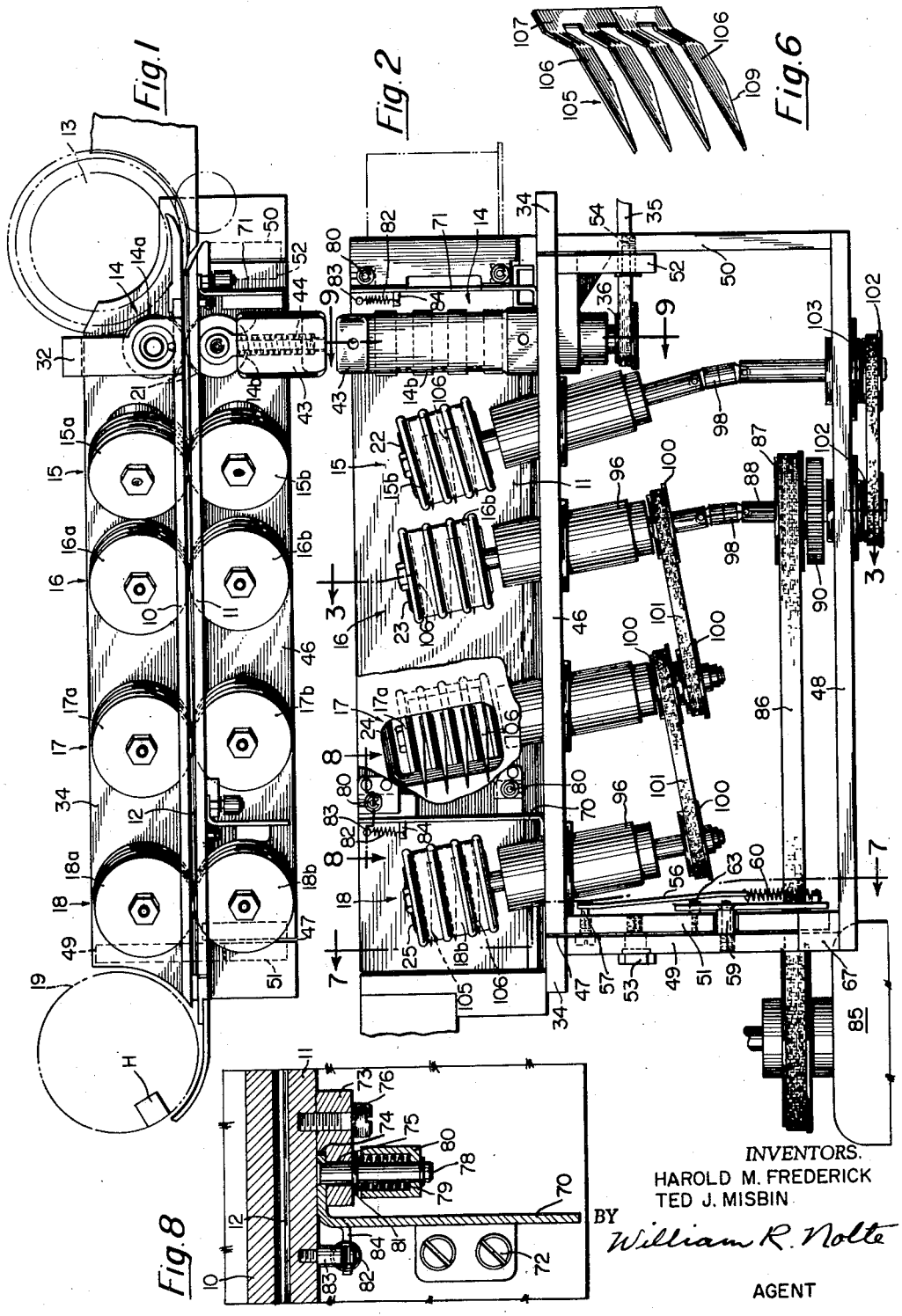
INVENTORS.
HAROLD M. FREDERICK
TED J. MISBIN
BY William R. Nolte
AGENT Aug. 8, 1961 H. M. FREDERICK ET AL 2,995,364
ITEM FEEDING AND ALIGNING APPARATUS
Filed Nov. 17, 1958 3 Sheets-Sheet 2
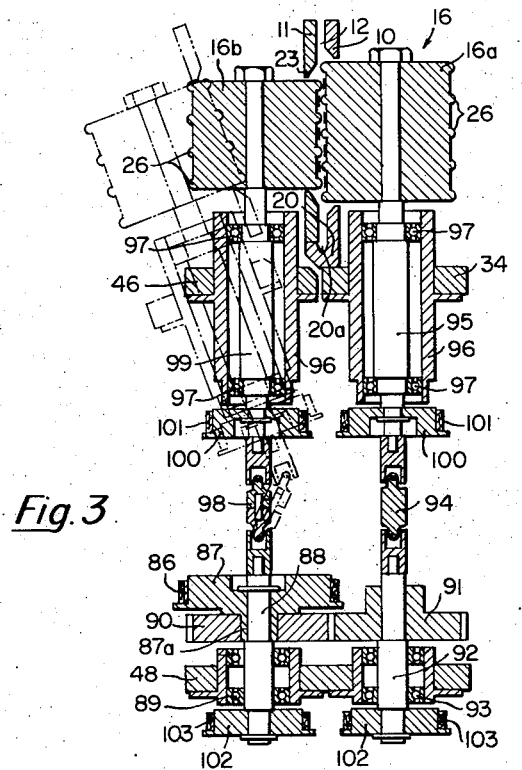
Fig. 3
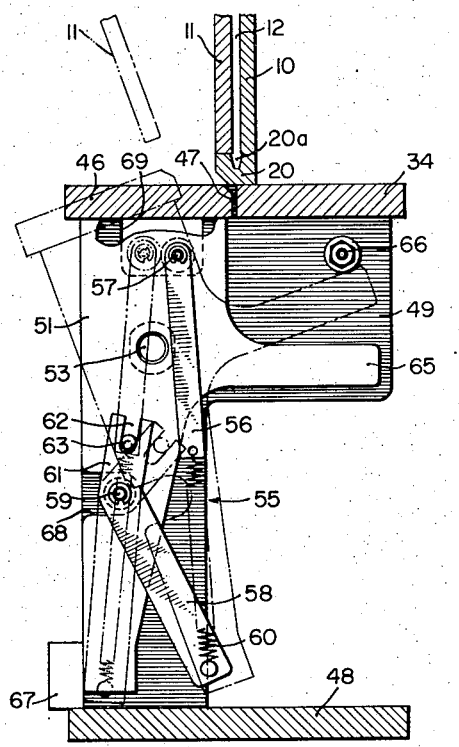
Fig. 7
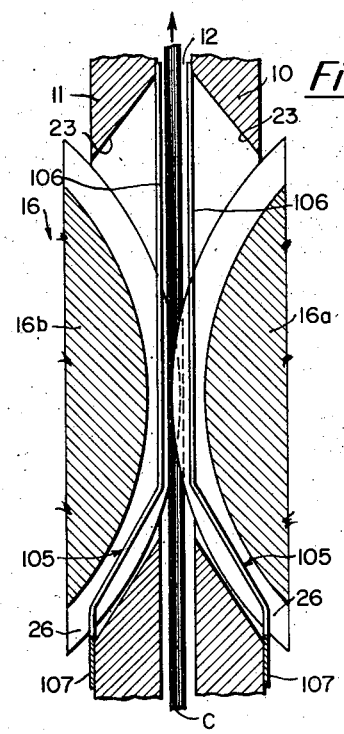
Fig. 5
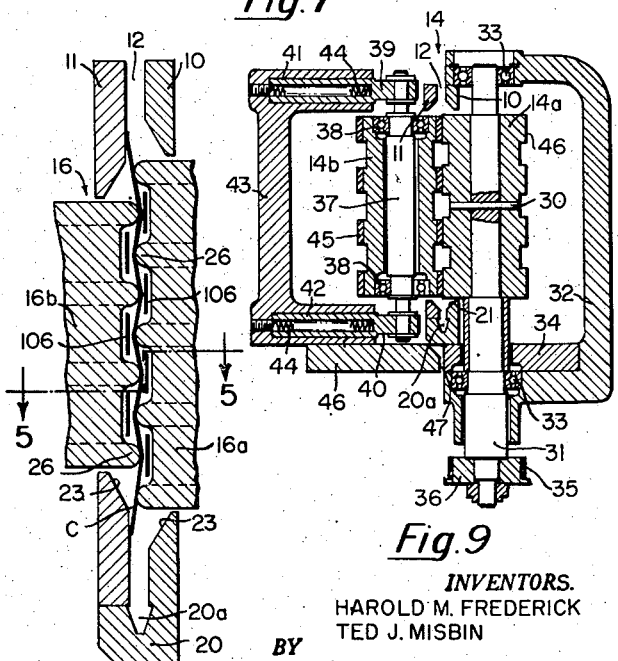
Fig. 4
Fig. 9
INVENTORS.
HAROLD M. FREDERICK
TED J. MISBIN
BY William R. Nolte
AGENT

United States Patent Office 2,995,364
Patented Aug. 8, 1961

1

2,995,364
ITEM FEEDING AND ALIGNING APPARATUS
Harold M. Frederick, Berwyn, and Ted J. Misbin, Bryn Mawr, Pa., assignors to Burroughs Corporation, Detroit, Mich., a corporation of Michigan
Filed Nov. 17, 1958, Ser. No. 774,174
4 Claims. (Cl. 271—52)

This invention relates to item feeders and more particularly to apparatus for feeding and aligning paper items in the form of bank checks or cards.

Bank checks come in a multitude of sizes and thicknesses making their handling simultaneously by automatic machines, such as sorters, a rather difficult matter. Sorters operate by sensing coded or other indicia placed on the checks in the form of punched holes, magnetically or frequency responsive characters, or by some other means, any of which must be aligned with sensing means for reading the indicia to effect selection of appropriate sorting bins.

It may be a comparatively simple matter to provide apparatus in such a machine for aligning sheet items or checks with the sensing means when all the items to be handled are of the same size and thickness, but it is an entirely different and complex matter to provide a single mechanism capable of so handling such similarly sized sheets and additionally being capable of handling with equal facility intermixed items of various sizes and thicknesses.

An important object of the present invention therefore, is to provide a novel mechanism for handling and aligning sheet items of similar or intermixed sizes during movement of the items through automatic item handling machines such as document or bank check sorters.

Another difficulty arising when handling paper items such as checks is due to the mutilation of the item by the users. Often this mutilation takes the form of crumpling, sometimes tears, and sometimes folds. Regardless of their condition, however, and with few exceptions, it is desirable to process them in the same manner as those not mutilated.

Therefore, it is another object of the present invention to provide a sheet handling and aligning mechanism capable of processing mutilated items, yet providing means whereby excessively mutilated items may easily be removed.

In accordance with the above objects and first briefly described the invention comprises novel apparatus for successively receiving sheet items such as bank checks in a wide range of sizes and conditions and feeding them through a guideway while simultaneously moving each item into contact with an edge guide whereby further movement of the items in the machine is in common edge alignment. The apparatus further includes means enabling the removal of excessively mutilated items which the apparatus cannot handle.

The invention may be more fully understood by referring to the accompanying drawings which illustrate the preferred arrangement in which:

FIG. 1 is a plan view of a mechanism embodying the preferred form of the invention;

FIG. 2 is a side elevational view of the mechanism;

FIG. 3 is a sectional view taken along the line 3—3 of FIG. 2;

FIG. 4 is an enlarged view of a portion of the sectional view of FIG. 3;

FIG. 5 is a sectional view taken along the line 5—5 of FIG. 4;

FIG. 6 is a perspective view of a spring member of the mechanism;

2

Figure 10:
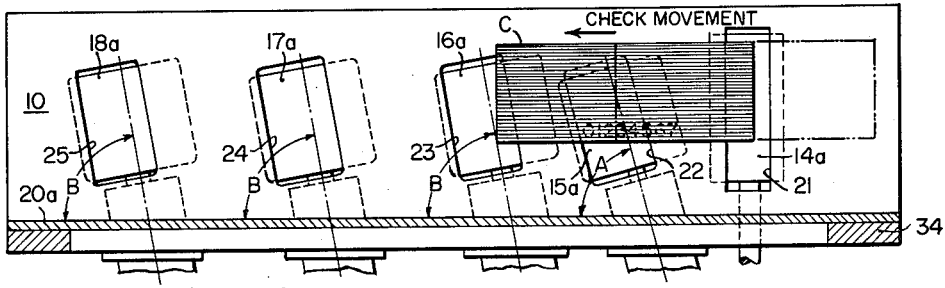

FIG. 7 is a sectional view taken along the line 7—7 of FIG. 2;

FIG. 8 is a sectional view taken along the line 8—8 of FIG. 2;

FIG. 9 is a sectional view taken along the line 9—9 of FIG. 2; and

FIGS. 10 to 13 inclusive are schematic views showing progressive positions of an item travelling through the mechanism.

Briefly described the illustrated embodiment of the invention comprises means for advancing record items, such as bank checks, through a guideway and edge aligning the same along an edge guide therein, including spaced sets of rollers, preferably having intermeshing peripheral portions and whose axes are disposed at varying angles with respect to the edge guide. As they are advanced through successive sets of rollers the items are also moved downwardly in a manner first bringing their trailing edge portions into contact with the edge guide closely followed by their leading edge portions. The edge guide includes means which diminishes any tendency of the edge of the document which first makes contact with the guide to fold back upon itself and become jammed in the guideway. The guideway includes means enabling it to be opened for the removal of excessively mutilated items.

More specifically as hereinafter described, the invention is incorporated in a check handling machine, such as a sorter, which for clarity of illustration is only partially shown. The apparatus, as seen in FIGS. 1, 2, 3 and 4 includes a pair of vertically disposed plates 10 and 11 arranged in spaced parallel relation with each other to form a channel or guideway 12 through which the checks are transported. While the invention contemplates the handling of checks or other sheets which are all of the same size and character of material, the novelty of the invention becomes more apparent, however, when checks of different sizes and thicknesses are being handled.

The check may be introduced into the guideway in other convenient ways, but in the presently illustrated form, a large roller 13 shown in phantom at the right of FIG. 1, introduces the items into the guideway where they are gripped successively by pairs of rollers 14 to 18 inclusive. Roller 13, may, for example, comprise a high speed roller of the item feeder described and claimed in the copending application of Solyst entitled "Sheet Feeder" filed December 19, 1958, Serial No. 781,729 and assigned to the assignee of the present invention. As the checks leave the guideway at the left, they are moved around a drum 19 also shown in phantom and having means H for sensing indicia which may be imprinted on each check in a line parallel to its bottom edge. Drum 19, for example, may be provided in accordance with the teaching in the copending application of Frederick entitled "Record Handling and Reading Apparatus," filed December 31, 1958, Serial No. 784,284 and assigned to the same assignee as the present invention.

A track 20 (FIGS. 3 and 4) is disposed along the bottom guideway 12 whereby the bottom edge of each check is positioned parallel to its line of travel through the guideway and prior to its reaching the sensing drum 19. While the track may be provided by other means, in the present embodiment it is formed by a lateral extension of the bottom edge portion of wall 10. To prevent mutilated corners of the items being handled from becoming wedged between the juncture of walls 10 and 11, the track is provided with a V-groove 20a the bottom surface of which provides the alignment guide.

In the present embodiment of the invention the pairs of rollers 14 to 18 inclusive each include rollers, designated by the letter *a* and *b* which have portions thereof extending into guideway 12 through pairs of slots 21 to 25 inclusive cut through guide plates 10 and 11, as seen in FIGS. 4 and 5. Rollers 15a to 18b each include axially spaced intermeshing or overlapping ridge portions 26. For example, and as seen more clearly in FIG. 4, the ridges of roller 16b are disposed in the spaces between the ridges of the opposite roller 16a. The amount of overlap between the successive intermeshing ridge portions of the oppositely disposed rollers is such as to accommodate different thicknesses of sheet material, such as check C. Checks passing between the rollers are corrugated by the ridges, thus to impart longitudinal stiffness to the checks as they advance through guideway 12.

Referring now to FIGURES 1, 2 and 9 it will be observed that the rollers in pair 14 are of a different construction than the previously described rollers 15 to 18 inclusive. Roller 14a is secured by pin 30 to shaft 31 which in turn is suitably journalled for rotation in a C-frame 32 by bearings 33 above and below the roller. The lower portion of the C-frame is suitably secured to horizontally disposed stationary plate 34. A continuous source of rotative power (not shown) is applied to belt 35 which frictionally engages pulley 36 suitably keyed to the lower extremity of shaft 31 thus to rotate rollers 14 at the same speed as rollers 15 through 18, as hereinafter described.

Roller 14b complemental to roller 14a is mounted for rotation on shaft 37 by bearings 38 disposed at each end thereof. The extremities of shaft 37 are engaged by top and bottom clevis elements 39 and 40 which are telescopically engaged in corresponding bore 41 and 42 of a C-shaped member 43. Springs 44 received within said bores urge the clevis members toward guideway 12 and maintain a constant pressure between rollers 14a and 14b. It is seen that roller 14b includes a plurality of wide resilient bands or tires 45 disposed in spaced relation about its outer surface. These tires are of resilient material having a high coefficient of friction and are adapted to exert a high gripping force on a sheet item passed between the rollers. Roller 14a may be of a metallic material and includes a plurality of spaced wide annular raised portions 46 which engage tires 45.

Now with reference to FIG. 2, it will be seen that the rollers are inclined at various angles with respect to the edge guide 20. More specifically, and as seen in FIG. 10, the pair of rollers 14 are perpendicular to V-track 20, rollers 15 are disposed at an angle A with respect to the track, while rollers 16, 17 and 18 are disposed at the angle B which is greater than angle A. This angular position and the spacing of the roller pairs is utilized to move the checks in edge alignment with the guide track 20, as will now be described with reference to FIGS. 10 to 13.

First, however, it will be understood that the amount of gripping action imparted to each item C will depend upon its thickness and the stiffness inherent in the material from which it is made. Thus a very thin item will be deflected a smaller amount than a thick one and it will accordingly be gripped with less force than the thicker one which would be deflected a greater amount. Considering the size of the item and the nature of the material as remaining constant, a thick uncrumpled check would have a greater mass than a thin check, and therefore would be gripped by the opposing roller with greater force when passing through the guideway, consequently such thicker checks would have greater driving forces applied to them than a thinner item of less mass. It should further be apparent along the same lines that a crumpled item passing through the rollers, regardless of its original stiffness, would have less stiffness and accordingly would be gripped with less force than a corresponding stiff item.

This is a distinct advantage, as the items with the greatest tendency to buckle—the thin or crumpled ones— will be brought into contact with the edge guide with less force than those—the thicker ones—better able to withstand such contact.

To better illustrate the action, the rollers are shown only on one side of the guideway but it is understood, as described above, that the checks are gripped from both sides. The check C in FIG. 10 is shown as being in contact with roller pairs 14 and 15. It will be recalled that roller 14b has mounted thereon resilient tires which have a high coefficient of friction, and in combination with roller 14a grip the item tightly and positively. As a consequence even though the axes of rollers 15 are inclined with respect to guide track 20, rollers 14 resist the downward component of forces applied to the surfaces of the check by rollers 15, the effect of which is cancelled out by slippage of rollers 15 on the check surfaces. As the item, however, advances to the position shown in FIG. 11 it becomes free of restraining rollers 14 and is now gripped at its leading edge portion by rollers 16 as well as by rollers 15 at its trailing edge portion. Since the latter rollers are at a greater angle with respect to the guide track than the former, the forces applied by roller 15 will cause the item to be pivoted clockwise so that its trailing edge portion is brought down closer to the aligning guide track than the leading edge.

Figure 11:
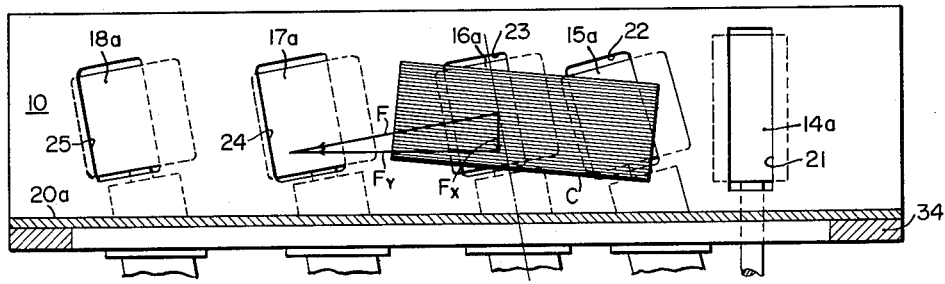
Figure 12:
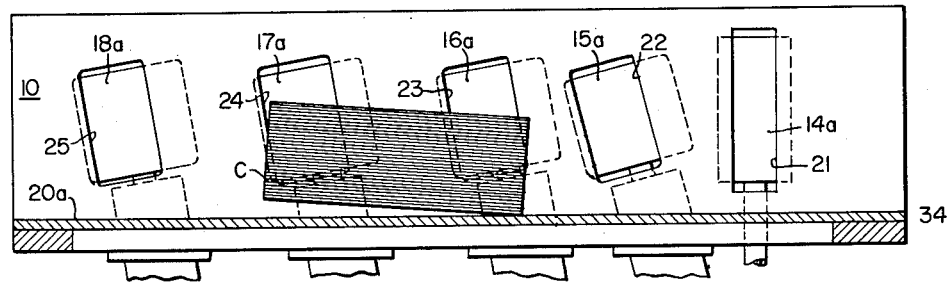
Figure 13:
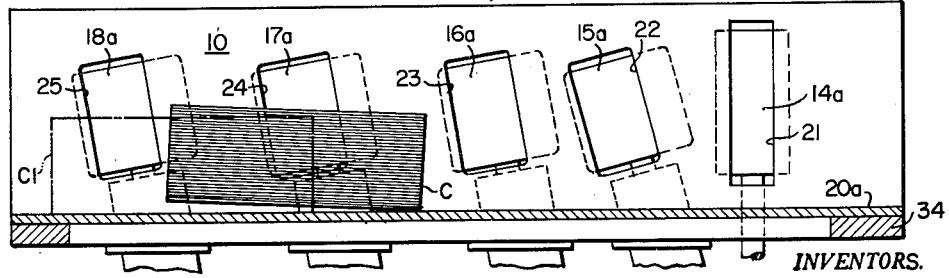

As seen in detail in FIGURE 4, the ridge portions 26 of the rollers make arcuate contact with the check C to drive the same in a direction tangent to the driving rollers and perpendicular to their axes of rotation. This can be followed more clearly by referring to FIGURE 11 on which the force components resulting from the action of the pair of rollers 16 have been diagrammatically applied. The vector F represents the resultant of the tangential forces applied by the ridges of the intermeshing rollers with Fy representing the horizontal component of said force parallel to the track 20, and Fx representing the vertical component of said force perpendicular to the track. As the trailing edge of the check bottoms, as seen in FIGURE 12, the vertical component of force Fx is absorbed by slippage of the rollers on the check and thus cancelled out. Well polished stainless steel has been found to provide a satisfactory coefficient of friction to drive the checks through the guideway while at the same time having no tendency to leave marks on the items when such slippage occurs.

As shown, the inclination of the pairs of rollers 16 and 17 are the same and correspond to the angle B. The effect of the rollers on the check prior to contact of the latter with the V-track is to maintain the nose-up attitude previously imparted to the check by rollers 15 and 16, as seen in FIGURE 11. In FIGURE 12 the check is seen bottoming at its trailing edge on the V-track 20. During further advance of the check to the successive illustrated positions shown in FIGURE 13, rollers 18 move the forward portion of the check downwardly until its whole bottom edge is aligned with the bottom of the V-track, as illustrated in the phantom line position C1 of the check. It should again be borne in mind that the component of forces applied by the ridges 26 of the rollers are at right angles to the axis of rotation of the rollers. As a consequence it can be stated that as the item bottoms in the V-track 13 the downward component of force of rollers 17 and 18 is cancelled out by slippage of the rollers relative to the check.

While only one check has been illustrated on its course through the mechanism, it is obvious that other checks of the same or different sizes can be similarly handled by the device. It should also be understood that differently sized checks or other sheet items being handled by the machine may enter the guideway at the right hand side (FIG. 10) at the same or other angles relative to rollers 14 than the item C shown, and be edge aligned as described above.

In this illustrative embodiment of the invention it will be understood that edge guide 20 is arranged in alignment with roller 19 so that the indicia across the bottom edge of the checks is aligned with the sensing means H on roller 19. Now it can easily be understood that by the simple expedient of placing such indicia a predetermined distance from the bottom edges of all checks—regardless of size and thickness—that this invention provides a mechanism for automatically handling and aligning such items regardless of whether they are all of one size or of intermixed sizes.

Sometimes, in spite of all precautions, a check may be so mutilated as to cause it to become jammed in the guideway. In such event, or other accidental malfunctioning, guide plate 11 is mounted for movement away from guide plate 10 so that channel 12 may be opened wide to remove the jammed item, see FIGS. 1, 2, and 7.

For this purpose, as seen in FIG. 3, guide plate 11 is mounted for limited movement between terminal open and closed positions relative to plate 10. Plate 11 is mounted upon a horizontally disposed plate 46 which is normally received in a rectangular recess 47 (FIG. 1) of the aforementioned stationary plate 34. The V-track 20 integral with guide plate 10 is supported on stationary plate 34 which in turn is supported in spaced parallel relation relative to base plate 48 by legs 49 and 50. Horizontal plate 46 and guide plate 11 are supported for pivotal movement by hinge plates 51 and 52 secured respectively to legs 49 and 50 by means of hinge pins 53 and 54.

A spring actuated over-center linkage 55 (FIG. 7) connected to plate 51 serves to lock guide plate 11 in its open or closed positions. For this purpose the linkage includes a downwardly depending link 56 which is pivotally connected to the upper end of plate 51 as at 57, a bellcrank 58 pivotally mounted as at 59 to outer frame leg 49, and a tension spring 60 suitably secured between the lower extremities of link 56 and bellcrank 58. When the linkage is moved over center with respect to pins 53 by moving plate 11 to the left or the right from its terminal open or closed positions the spring 60 supplies the force to rotate plate 51 to its other terminal position. To this end the upper arm 61 of bellcrank 58 is slotted as at 62 to receive a pin 63 rigidly fixed to plate 51. When the guide plate 11 is in closed position shown in full lines in FIG. 7, spring 60 through bellcrank 58 and pin 63 urges plate 51 and hence guide plate 11 in a clockwise direction thus to retain plate 11 in its operative position cooperating with plate 10 to form guideway 12. When, however, the guide plate 11 is manually opened to the phantom line position shown in FIG. 7, pin 63 urges bellcrank 58 counter clockwise to move spring 60 over center with respect to hinge pin 53, thus to urge plate 51 in a counter-clockwise direction and retain plate 11 in its open inoperative position. Arm 65 integral with leg 51 limits the pivotal movement of the aforedescribed linkage by engaging stop 66 when in its opened position, while block 67 in the path of movement of the lower extremity of leg 51, see FIGURE 7, is used to limit the hinge movement to its closed position. Plate 51 is notched as at 68 to accommodate the bellcrank pivot 59, while outer frame leg member 49 is cut out as at 69 to permit travel of pivot 57 associated with hinge plate 51. Guide plate 11 is mounted for limited movement relative to horizontally disposed movable plate 46 to provide and insure a tight fit or junction of plate 11 with guide track 20. This can be followed in greater detail by referring to FIGS. 2 and 8. FIG. 2 shows vertically disposed angle members 70 and 71 fixed at opposite ends of horizontal plate 46 by screws 72 (FIG. 8). Inasmuch as the connections of the brackets to the guide plate 11 are the same at each of its ends, the following description refers only to the connection at the left end as illustrated in FIGURE 8. A block 73 recessed at 74 and notched vertically as at 75 is rigidly fixed to vertical guide plate 11 by means of screws 76. A flange 77 of angle member 70 is received in recess 74 and a pin 78 fixed to said flange rides in vertically disposed notch 75. A cap 80 received on pin 78 encloses spring 79 which along with washer 81 is mounted for sliding movement on said pin to urge the guide plate 11 into engagement with flange 47 of member 70. As seen in FIG. 2, slot 75 is elongated to permit vertical movement of plate 11 relative to horizontal plate 46. The amount of this movement is controlled by a spring 82 connected at its top end to pin 83 fixed to guide plate 11 while secured at its lower end to a spur 84 integral with member 70. Thus it can be seen that the aforedescribed structure provides a floating connection for guide plate 11 relative to plate 46 to insure that guide plate 11 will bottom on V-track 20 throughout its entire length when the plate 11 is moved from its open to its closed position, as seen in FIG. 3.

Rollers 14 through 18 preferably are all rotated at the same speed. Referring to FIGS. 2 and 3 it will be seen that rotative power to so drive rollers 15 through 18 is supplied by motor 85 through belt 86 to pulley 87 mounted on stub shaft 88 which is suitably mounted for rotation on base plate 48 by bearings 89 (FIG. 3). A gear 90 secured to the hub 87a of gear 87 meshes with a companion gear 91 suitably keyed to a stub shaft 92 which is likewise rotatably mounted on base plate 48 by bearings 93. Shaft 92 is connected through universal coupling 94 to roller shaft 95 on the upper end of which is secured roller 16a. Flanged sleeve member 96 secured to and extending through horizontal plate member 34 rotatably supports shaft 95 by means of bearings 97. In a similar manner universal coupling 98 connects stub shaft 88 to shaft 99 to drive roller 16b rigidly fixed thereto, shaft 99 being mounted on plate 46 similarly to the mounting of shaft 95 on plate 34.

In addition to providing means for driving the rollers from an angularly related drive shaft, universal coupling 98 permits the pivotal movement of plate 11 and its associated structure, as seen in FIG. 3.

Rollers 17 and 18 are mounted for rotation relative to plate 34 and 46 respectively in a manner similar to that shown in FIGURE 3. Moreover rotative power is transmitted from shafts 95 and 99 to corresponding shafts of the above mentioned rollers 17 and 18 by means of pulleys 100 fastened to said shafts, and belts 101 interconnecting adjacent sets of pulleys. The pair of rollers 15 are mounted for rotation in a manner similar to that shown in FIGURE 3 and also are driven at the same rotational speed as that of rollers 16 to 18 inclusive. Referring to FIGS. 2 and 3 it is observed that the drive for the pair of rollers 15 is through pulleys 102 mounted on the lower ends of each of stub shafts 88 and 92 beneath base plate 48, and belts 103.

Referring now to FIGS. 2, 5 and 6 it will be seen that a comb member 105 is assembled with each of rollers 15a to 18b inclusive. Each comb includes a plurality of parallel fingers 106, extending from and bent outwardly from a back portion 107 thereof. The free end of each finger includes a tapered portion as at 109. When assembled with the ridged rollers back portion 107 of the comb is positioned against the outside surface of the guide plates (FIG. 5) while the fingers 106 span the recess through which the roller extends. As best seen in FIG. 4 the spring fingers of the combs pass between the rollers and prevent the advancing leading edges of the checks from curling upwardly or downwardly between the rollers and into the roller recesses in the plates.

Having thus described the preferred embodiment of the device for purposes of illustration, it is to be understood that the inventive concept may be embodied in other forms without departing from the scope of the invention.

We claim:

1. A device for sequentially edge aligning intermixed sheet items of different thicknesses while moving the same in a given direction, comprising an edge guide, a plurality of pairs of opposed rollers spaced along said guide and inclined with their axes of rotation at different angles toward the latter to positively drive the items along and toward the edge guide in said given direction, the rollers of each pair having flange portions rotatable in planes normal to the axes of rotation of the rollers with the flange portions of one roller of said pair being axially spaced relative to the flange portions of the other roller of the pair, and means for positively rotating said pairs of rollers to cause each of said sheet items when engaged between the flange portions of the rollers to be corrugated by amounts proportional to the thickness of the item and simultaneously to be moved along said edge guide in said given direction and into edge alignment with said edge guide, whereby said item slips relative to the flange portions of said rollers in a direction perpendicular to said edge guide while moved in said given direction.

2. A device for sequentially edge aligning intermixed sheet items of different thicknesses while moving the same in a given direction, comprising an edge guide, a plurality of pairs of opposed rollers spaced along said guide and having their axes of rotation inclined toward the edge guide to positively drive the items along the edge guide in said given direction and also toward the edge guide at a canted relation thereto, the rollers of each pair of rollers having flange portions rotatable in planes normal to the axes of rotation of the rollers with the flange portions of one roller of said pair being axially spaced relative to the flange portions of the other roller of the pair, and means for positively rotating said pairs of rollers to cause each of said sheet items when engaged between the flange portions of the rollers to be corrugated by amounts proportional to the thickness of the item, and simultaneously to be moved along said edge guide in said given direction and toward said edge guide to engage a portion of one edge of each said item with the edge guide to cause the item to pivot about said initial contacting portion, whereby said item slips through said flange portions to align said one edge of the item with the edge guide.

3. A device for sequentially edge aligning intermixed sheet items of different thicknesses while moving the same in a given direction comprising, an edge guide having a generally V-shaped track therein, a plurality of pairs of opposed rollers spaced along said edge guide and having their axes of rotation inclined toward said edge guide to advance the items both along and toward the edge guide in the direction of feed of said items, the rollers of each pair including axially spaced flange portions with the flanges of one roller of each pair being disposed opposite the spaces between the flange portions of the opposite roller of the pair, and means for positively rotating said pairs of rollers to cause each said sheet item engaged therebetween to be corrugated and simultaneously to be urged positively along said edge guide in said given direction and toward and into the V-shaped track of the edge guide, whereby upon engagement of said items with the bottom of the V-shaped track of the edge guide, the reactive force of the latter induces sliding of said items relative to the flange portions of said rollers irrespective of the thicknesses of the items so engaged.

4. A device for sequentially edge aligning sheet items of intermixed sizes and different thicknesses transported in a given direction of feed, comprising, an edge guide, a pair of opposed pressure engaging rollers mounted with their axes of rotation at right angles to said edge guide to tightly grip the sheet items during their full extent of travel therethrough, first and second pairs of opposed rollers spaced in that order relative to said pair of pressure engaging rollers and along the guide and having their axes of rotation inclined toward the guide so as to advance the items along and toward the edge guide, said axes of rotation of said first and second pairs of rollers inclining at different angles with respect to said edge guide wherein the angle formed by the axes of said second pair of rollers is greater than the angle formed by the axes of said first pair of rollers with respect to said edge guide, the spacing between each pair of rollers measured along said edge guide being less than one half the length of the shortest sheet item being handled, said first and second pairs of rollers including a plurality of flange portions to corrugate said sheet items of different thicknesses therebetween, each said sheet item when simultaneously gripped between the pair of pressure rollers and the first pair of rollers is engaged by the flanged portions of the latter in sliding contact therewith, and upon further advancement of said item along and toward the edge guide to a position free of said pair of pressure rollers but gripped between the first and said second pairs of rollers the item is rotated and slips relative to the flange portions of said first and second pairs of rollers.

References Cited in the file of this patent
UNITED STATES PATENTS

| | | |
|---|---|---|
| 1,628,225 | Bradshaw | May 10, 1927 |
| 1,963,183 | Walker et al. | June 19, 1934 |
| 2,228,913 | Martin | Jan. 14, 1941 |
| 2,240,424 | Spiess | Apr. 29, 1941 |
| 2,302,067 | Spiess | Nov. 17, 1952 |
| 2,674,456 | Gibson | Apr. 6, 1954 |
| 2,843,377 | Battersby | July 15, 1958 |
| 2,880,999 | Oldenboon | Apr. 7, 1959 |